Feb. 2, 1960 R. A. STROTHER ET AL 2,923,182
INSTALLATION DEVICE FOR PULL-TYPE FASTENERS
Filed Dec. 18, 1958
2 Sheets-Sheet 1
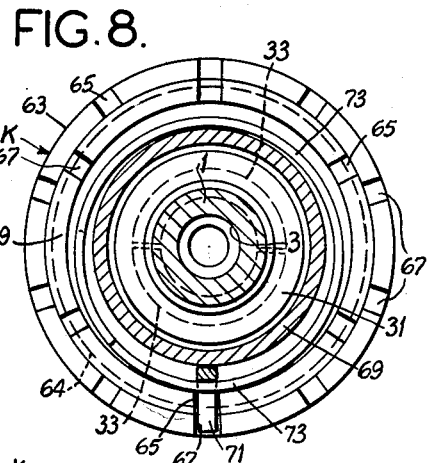
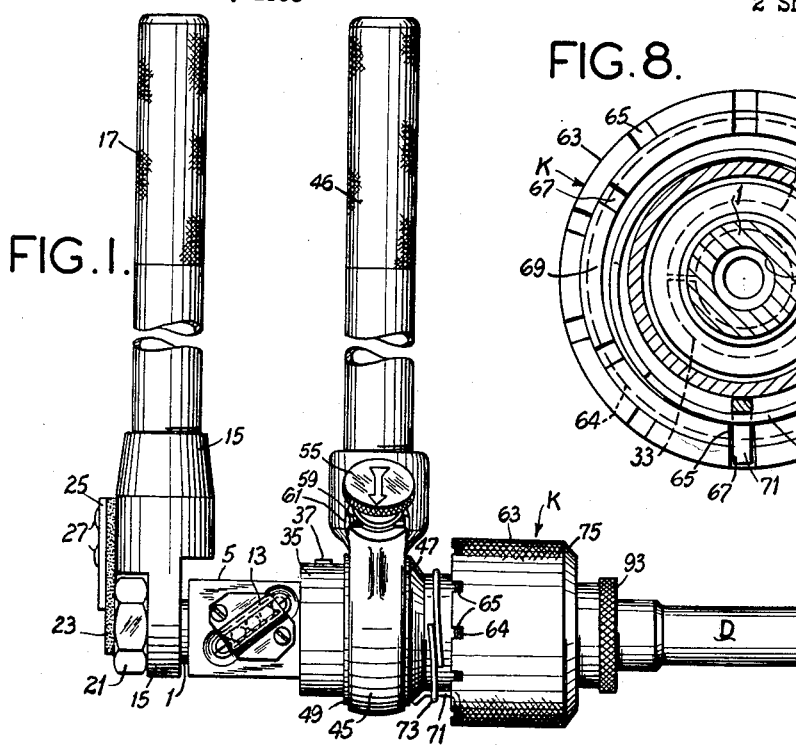
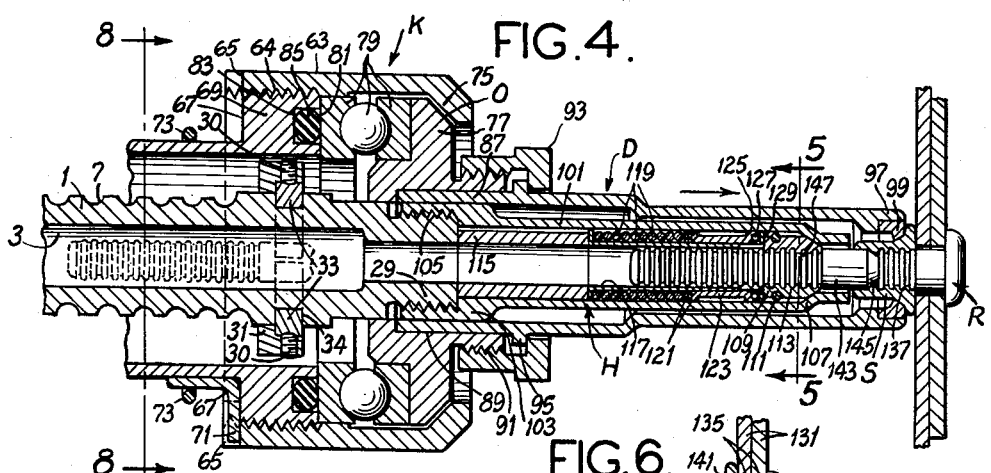
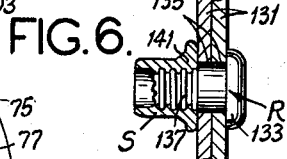
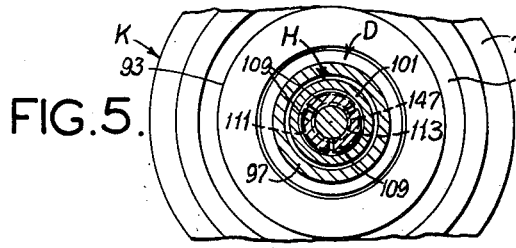

Feb. 2, 1960    R. A. STROTHER ET AL    2,923,182
INSTALLATION DEVICE FOR PULL-TYPE FASTENERS
Filed Dec. 18, 1958    2 Sheets-Sheet 2
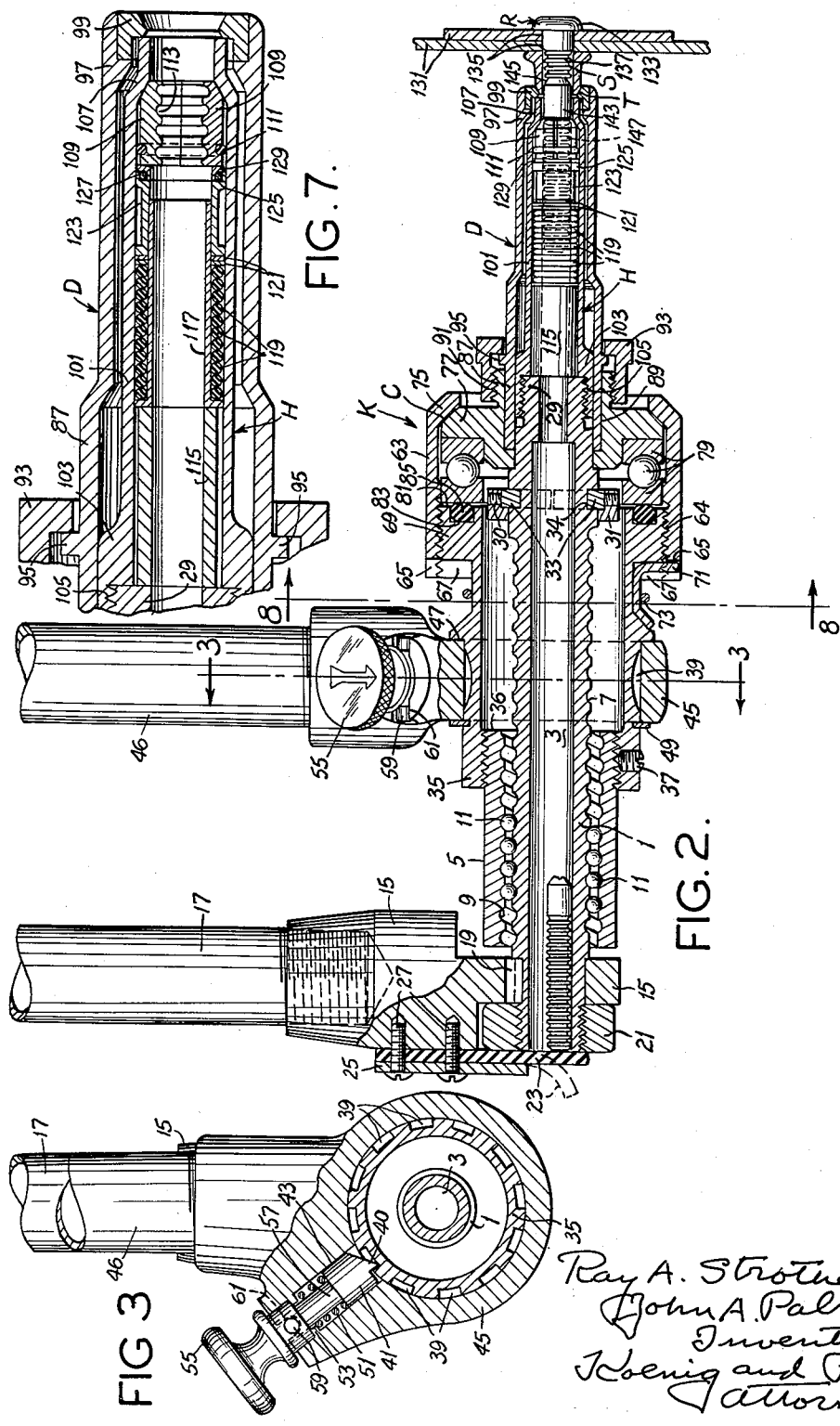

United States Patent Office 2,923,182
Patented Feb. 2, 1960

2,923,182

INSTALLATION DEVICE FOR PULL-TYPE FASTENERS

Ray A. Strother, Normandy, and John A. Palmer, University City, Mo.; said Palmer assignor to said Strother Application December 18, 1958, Serial No. 781,306

16 Claims. (Cl. 78—46)

This invention relates to installation devices for pull-type fasteners or the like, and with regard to certain more specific features to a mechanically operated, as distinguished from a fluid-operated, device of this general class.

Among the several objects of the invention may be noted the provision of a convenient, safe, compact, manually operable mechanical device for installing and setting pull-type rivets and other so-called blind fasteners; the provision of a device of the class described providing a large mechanical advantage between a small applied manual force and a large delivered force at a fastener; the provision of a device of the class described which is effective at high mechanical efficiency; and the provision of a device of the class described which may be effectively and conveniently operated in cramped quarters. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, Fig. 1 is a side elevation of the device;

Fig. 2 is an axial section of the device, as shown in Fig. 1 but applied to a rivet and shown on an enlarged scale, parts being shown in elevation, a certain operating clutch being shown closed;

Fig. 3 is a cross section taken on line 3—3 of Fig. 2;

Fig. 4 is a further enlarged axial section of the right end portions shown in Fig. 2, the clutch being shown open, all parts being in section;

Fig. 5 is a fragmentary cross section taken on line 5—5 of Fig. 4;

Fig. 6 is a fragmentary detail section showing a blind rivet completely installed after removal therefrom of the device;

Fig. 7 is a greatly enlarged view of certain nose thrust attachments of Fig. 4; and Fig. 8 is a cross section taken on line 8—8 of Fig. 2 and Fig. 4.

Corresponding reference characters indicate corresponding parts throughout the several views of the drawings.

There are on the market today a variety of pull-type fasteners, such as so-called pull-through and self-plugging blind rivets, blind lock bolts, aircraft lock bolts, so-called Tau bolts, OS rivets, Daisy and Top Side fasteners, etc., all of which require for their installation the application thereto of two movable members which are opposedly reactive with great thrust, such as for example at 10,000 pounds. Such thrust forces have heretofore been supplied by pneumatic or hydraulic pullers. The puller described herein is mechanical and manually operated, which of course limits to a few pounds the applied force available for producing the stated 10,000 pounds or so thrust required.

For the purpose of illustration, a lock bolt has been selected as the fastener in connection with which description of the invention will be made. Various so-called nose assemblies or adaptors are generally employed to present pneumatic and hydraulic pullers adapting them for effecting installation of various ones of the fasteners such as above listed. Only one set of such adaptors (applicable to the lock bolt shown) is described herein as illustrative of the various ones that may be employed in connection with the present invention.

Heretofore, as stated above, so-called pneumatic or hydraulic pull guns have been employed for effecting installation. Such guns are satisfactory under conditions of quantity factory installation of the fastening devices, but are impractical for repair and installation purposes in the field, this being for want of a convenient pressure supply in field locations and ineffectiveness in cramped quarters. The present invention provides a compact and convenient manually operable ratchet type of puller adapted interchangeably to employ said former nose pieces for installing various fasteners of the class described, either in the field or in the factory. It includes means for assuring proper ratcheting and other operations without the need for finicky movements by the operator.

Referring now more particularly to Figs. 1–3 of the drawings, there is shown at numeral 1 an exteriorly threaded axial screw which is hollow, as shown at 3. Around the screw 1 is located an interiorly threaded nut 5. The threads 7 of the screw and the threads 9 of the nut 5 are semicircular for the reception therebetween of ball bearings 11, thereby forming what is known in the art as an Edison screw. Such screws have a low coefficient of friction due to the essential rolling action of the balls in the containing threads. In order that there may be continuous threading action, the balls are fed out of and into the helical space between the containing threads by the usual loop return passage means such as indicated at 13 in Fig. 1 associated with the side of the nut 5. As appears in Fig. 1, the exterior of the nut is of flat-sided form with which the return passage means 13 may conveniently be organized. Many of the advantages of the invention may be obtained by the use of a conventional threaded connection between screw 1 and nut 5 but the Edison screw connection is preferable because of its free running and antifriction characteristics. These, however, introduce certain problems in connection with a ratchet (to be described) which the present invention solves.

At numeral 15 is shown a member into which is threaded a holding handle or lever 17. Member 15 is attached to the hollow screw 1 by means of a key 19 and a holding nut 21. At numeral 23 is shown a flexible cover flap composed of a material such as rubber adapted normally to enclose the open end of the hollow 3 of screw 1. The flap 23 may be bent into the dotted line position shown in Fig. 2 for releasing objects from the hollow 3 as will be described. The cover 23 is held in position by plate 25 attached to member 15 by screws 27.

The other end of the hollow screw 1 is provided with a threaded nose-piece holder 29. A collar 31 is attached to the screw 1 by pressing it over a pair of semicircular lock rings 33 seated in a groove 34 in the screw. Set screws 30 maintain parts 31 and 33 in place. The collar 31 forms an abutment shoulder for engagement with the right hand end 36 of the nut 5 in order to prevent the screw and the nut from being completely separated.

An extension 35 is threaded to the nut 5 and securely locked in position by a set screw 37. This extension 35 carries external ratchet teeth 39 engageable by a reversible cylindrical pawl 41. The pawl 41 is slidably and rotatably mounted in a guide hole 43 of a hub 45. Hub 45 is rotatable on the extension 35 and abuts a shoulder 47, being held in place axially on its opposite side by means of a snap ring 49. A sloping tooth 40 of pawl 41 has bias toward engagement between the ratchet teeth 39 provided by a compression coil spring 51 reacting on the pawl from a shoulder 53. Carried on the upper end of a stem 57 of the pawl 41 by means of a cross pin 59 is a control button 55. This button is thereby attached to the stem 57. The spring 51 not only biases the pawl 41 into engagement with the teeth 39 but also biases the cross pin 59 into opposite slots 61 cut into the hub 45 above the shoulder 53. Thus the pawl 41 upon retraction, and rotation in either of two opposite directions, and release of the button 55, may be set into either of two positions at 180° to one another for causing ratcheting the hub 45 by tooth 41 in either of two opposite directions of rotation with respect to the screw 1. A handle or lever 46 screwed into hub 45 provides means for turning the hub 45.

The right-hand end 69 of the extension 35 is threaded to receive a threaded clutch housing 63 (see threads 64). The clutch will hereinafter be lettered K in general. The threaded end 69 and the housing 63 are provided with castellations 67 and 65 respectively, two of which castellations may be aligned for insertion of a locking key 71. The key 71 is removably held in place by a removable split spring ring 73 carried around the nut extension 35. Thus any threaded adjusted position of the clutch housing 63 may be maintained on the end 69 of extension 35.

The unthreaded end of the housing 63 is interiorly conical as indicated at 75 with which is frictionally engageable an inside conical clutch member 77. A ball thrust bearing assembly 79 is interposed between the clutch member 77 and a flat face 81 of the end part 69. The flat face 81 contains a circular groove 83 in which is located a resilient O-ring 85. The O-ring is normally thicker than the depth of groove 83. When this O-ring 85 is compressed by pressure of clutch member 77 on assembly 79, as shown in Fig. 4, the conical clutch faces on members 75 and 77 separate as indicated at 0 in Fig. 4. This opens the clutch K. On the other hand, when such pressure is at least partially released the conical clutch faces of the members 75 and 77 engage in closed position, as shown at C in Fig. 2. This is due to the reaction by expansion of the O-ring 85.

The parts above are adapted to receive thrust parts indicated in general at H and D respectively, known in the trade as nose pieces or parts. These have various forms, the form chosen for illustration being that adaptable to installing the blind rivet illustrated. Nose piece D is constituted by a sleeve 87 slidably fitted into and seated in a socket 89 formed in the clutch member 77. The clutch member 77 is provided with a threaded nose portion 91 around the socket 89 for the threaded reception of a holding ring 93. The end of the holding ring 93 engages lugs 95 on the nose piece D so as removably to hold the same in place in connection with the clutch member 77. Thus various nose pieces such as D may be interchanged. The outer end 97 of the nose piece D is provided with a hardened annular die ring 99 having swaging functions on rivet heads to be described.

The inner nose piece H (Fig. 7) consists of a cylinder 101 having an enlargement 103 removably threaded to the nose 29 (see threads 105). At its outer end the cylinder 101 is constricted conically as shown at 107. Within the conical portion 107 are three jaw clutch segments 109 resiliently biased by means of a surrounding resilient constricting O-ring 111. The inside of the jaws 109 are serrated as indicated at 113. Thus the jaws 109 and the conical portion 107 constitute a spring collet. This collet 107, 109 is biased to closed gripping position by axial thrust imposed on the jaws 109 from an internal sleeve 115 abutting against the nose 29 when the member 103 is threaded thereon.

Between the sleeve 115 and the clutch jaws 109 is a resilient thrust assembly consisting of a hollow sleeve 117 abutting sleeve 115. Sleeve 117 is surrounded by a stack of O-rings 119, the stack being terminated by a pair of surrounding washers 121. This stack 119, 121 compressively engages a sleeve 123, the other end of which is cupped as shown at 125 for the reception of another resilient O-ring 127 held in place by a hat washer 129. Sleeve 117 slides with sleeve 123. The hat washer 129 compressively engages the flush back ends of the jaws 109.

In view of the above, it will be apparent that when the nose piece H, with the parts therein assembled as shown and above described, is threaded at 103 to the nose 29 of the screw 1, there will be an axial resilient compressive force (due to compressed O-rings 119, 127) applied to the jaws 109 biasing them against the constriction 107. Thus the jaws are resiliently biased inward. It will be noted that the sleeve 115 is of proper length to bring about the resilient axial compressive effect by O-rings 119, 127 on jaws 109 as the nose piece H is threaded into position on the screw 1.

A typical fastener to which the device is applicable is shown at R in Figs. 2 and 4. This is a lock bolt for attaching two plates 131. The bolt has a headed portion 133 passing through aligned openings 135 in the plates 131, and a shank. The shank is composed in part of a grooved portion 137 onto which an undeformed malleable sleeve S, such as shown at Fig. 2, is to be radially swaged into its squeezed holding condition shown at 141 in Figs. 4 and 6, wherein a base collar is formed. This bolt head S is shown in its unswaged condition in Fig. 2 and in its swaged squeezed condition in Fig. 4. The bolt shank also has an extension from its grooved portion 137 consisting of a smooth cylindrical portion 143 attached to portion 137 by a breakable necked-down part 145. Beyond the part 143 the bolt R is provided with another grooved portion 147 adapted to be automatically clutched by the inwardly grooved jaws 109 (due to the spring collet 107, 109) when the nose piece H is axially slipped over the bolt. Such axial application occurs after the undeformed head S has been applied to the bolt in its position in the holes 135 (see Fig. 2). In this condition (Fig. 2) the die 99 is located adjacent the end of the undeformed bolt head S.

In view of the above, the general operation of the pulling device invention will be seen to be as follows:

First, by relative turning of handles 17 and 46 the nut 5 is screwed back to the starting position shown in Figs. 1 and 2. The clutch K is closed at C. The button 55 is set for ratcheting drive when the handle 46 is turned relative to the handle 17, which is anticlockwise as viewed from the right in Fig. 2 and as seen in Fig. 3. At this time a bolt R may be assumed to have been inserted into the opening 135 and an undeformed head sleeve S slipped over the portion 137 of its shank. Then the tool as a whole (as shown in Fig. 1) is pushed axially so as to drive the nose pieces H and D over the shank portions 147, 143 of the bolt R. The inwardly biased clutch jaws 109 ride over the grooved portion 147 of the bolt shank until the die 99 of the nose piece D engages the end of the bolt head T. Upon such engagement the jaws 109 automatically seat in the adjacent grooves 147 in the bolt shank portion.

Next, handle 17 is held stationary with one hand while handle 46 is pulled forward with the other hand (Fig. 2). That is, handle 46 is moved anticlockwise (Fig. 3). The tooth 40 of pawl 41 then engages an appropriate ratchet tooth 39 so as to rotate the assembly of nut 5 extension parts 35, 69 and clutch parts 63, 75. These parts will then initially advance spirally to the right from the clutch-closed position C such as shown in Fig. 2 to the clutch-open position O such as shown in Fig. 4. Clutch part 77 is at this time held back by reason of initial contact of die 99 with the end of the undeformed rivet head S. This brings about compression of the O-ring 85 and then engagement between the clutch end 69 of member 35 and the left side of the thrust bearing 79. Thus while the hollow screw 1 is held stationary by handle 17, the nut 5 advances to the right with respect thereto, first to open the clutch K and then to apply axial driving force through the parts 35, 69, 79, 77 to the nose piece D which is forced into swaging engagement with the end of the bolt head T. Reaction on the screw 1 draws back (pulls) nose piece 101 so that taper 107 wedges in the collet parts 109, thus gripping the grooved shank part 147 of the bolt. With a pressure on the order of 37 pounds pull on handle 46 (handle 17 stationary) about 10,000 pounds of reactive thrust can be obtained between the screw 1 (held by the collet parts 109 gripping bolt R) and the swaging parts connected with the nose piece D. The theoretical mechanical advantage to obtain this ratio of force is about 275 to 1.

One ratcheting stroke (clutch K open) effects a fraction of the complete swaging action. Repeated ratcheting action on the handle 46 will result in the die 99 progressively traveling by increments substantially entirely over the length head T and squeezing it into squeezed holding position with respect to the grooved part 137 of bolt R. This also produces collar 141. When the condition of parts is reached shown in Fig. 4, continued ratcheting will bring about application of sufficient tensile stress to the reduced section 145 of the bolt R to break it, as illustrated in Fig. 6. This drives the removed section 147, 143 down the hollow screw 3 to be stopped by the rubber closure 23. The initial impulse upon breakage tends to drive the clutch jaws 109 free of constriction 107 so that the separated bolt section 147, 143 becomes driven therefrom. After several pulled bolt sections collect in the hollow portion 1 in the screwed portion 3, they may be dumped by pulling back the resilient flap 23 as suggested by the dotted positon of flap 23 shown in Fig. 2.

A feature of the invention is the opening and closing action of the clutch K. As stated, it opens preliminarily as shown at O in Fig. 4 each time that the handle 46 is ratcheted forward to effect a partial swaging advance of the die on the bolt head T. For ruggedness and strength the pawl 41 and ratchet teeth 49 are necessarily coarse. On the other hand the Edison screw sets up little resistance against the return stroke of the ratchet carrying back the nut 5. Thus there is a substantial tendency for the pawl to drive the ratchet teeth backward upon a ratcheting return stroke. Obviously, if a backward stroke of the handle 46 were to return the nut 5 backward as far as it advances upon a forward stroke, progressive swaging on successive strokes would not occur. This contingency is avoided by the fact that any incipient backing-off of parts connected to nut 5 incipiently retracts the clutch part 75 to the left against stationary clutch part 77, the latter being held on nose piece D which is frictionally held to head S by the swaging die 99. This closes the clutch as shown at C in Fig. 2. Therefore, in effect parts 35, 69, 63, 75, 77 and the nose part D are all held stationary with the die 99 frictionally engaging on the bolt head S. Therefore there is considerable resistance imposed against backward turning of these parts including the ratchet teeth 39. The pawl 41 will therefore be enabled to ride over successive teeth 39 so as to return the handle 46 to an initial position from which to start a succeeding ratchet advance for additional axial swaging. Upon each advance of the nut 5 on screw 1, the contact of die 99 with head T sets up an initial resistance against the force due to the screwing action applied to parts 69, 79, 77 and nose piece D. This resistance by compressing O-ring 85 reopens the clutch and by contact between members 69 and 79 applies the maximum thrust necessary to advance to the swaging die 99 and ultimately to effect a break at neck 145 after the swaged collar 141 has been formed.

After the swaging is complete, as shown in Fig. 4, as caused by repeated ratcheting action, and the parts 147, 143 of the bolt R have been broken off, the tool may be retracted simply by withdrawing the die 99 from the bolt head T which has been set, as shown in Fig. 6. It will be observed that the purpose of the cylindrical portion of the cylinder 143 on the rivet is to guard against any swaging hold of the head T on the broken-off part of the bolt.

To prepare the tool for setting another bolt, the screw 1 is turned back into the nut 5; or what is the same thing, the nut 5 is run back on the screw until the parts are in the Fig. 2 starting position. It will be understood in conection with Fig. 4, which shows the condition of parts at approximately the end of a ratcheting riveting operation (just prior to breakage at the reduced section of 145), that the nut 5 will have been run to the right somewhat with respect to the screw 1 as compared with the position shown in Fig. 2.

The importance of the clutch which opens upon each ratcheting swaging advance and closes upon a return ratchet action will be apparent from the above. The purpose of the clutch adjustment afforded by the castellations 65, 67 and lock 71 is to provide the condition required for proper clutching and declutching action. Thus to condition the clutch properly when the device is initially assembled the clutch housing 63 is threaded onto the part 69 until the thrust bearing 79 seats solidly on part 69, the O-ring 85 being accordingly completely compressed back into its groove 83. Then the clutch housing 63 is backed off approximately five to ten degrees until registry is obtained between a notch 65 and a notch 67 for placement of a locking key 71. This backing-off adjustment will enable the expansive O-ring 85 to push the thrust bearing assembly 79 a small distance (for example a few thousandths of an inch) away from its seat on part 69 and to close the clutch K at C (Fig. 2). This is the distance later that the clutch element 77 will move during retractive ratcheting to open the clutch part 75, 77, as shown at O on Fig. 4.

The following in connection with the parts above described will clarify the terminology used in the appended claims:

The assembly 5, 35, 69, 63, 75 constitutes a reversibly rotatable member which has a threadable connection with the axial screw 1 with which is connected a first radial lever 17. The parts (except 1 and 35) shown in Fig. 3 constitute a reversible ratchet mechanism having a second radial lever 46 and being rotatable on said reversibly rotatable member adapted to drive it in either of two opposite rotary directions relative to the screw. The reversibly rotatable member forms a clutch face at 75 and a thrust face at 81, these being axially spaced. The member 77 is referred to as a second member having a second clutch face engageable and disengageable with the first clutch face. The bearing or its equivalent 79 constitutes an axial thrust member between said thrust face 81 and said second member 77 having the second clutch face. This thrust member is adapted to engage the thrust face when the clutch faces separate. The O-ring 85 constitutes resilient means biasing the thrust member towards this engagement from the thrust face and biasing the clutch faces towards one another. In this connection it is to be understood that axial coil springs might be substituted for the O-ring to provide the axial bias. The entire clutch K forms a connecting device between nut 5 and the thrust device D.

In view of the above, it will be seen that the several objects of the invention are achieved and other advantageous results attained.

As various changes could be made in the above constructions without departing from the scope of the invention, it is intended that all matter contained in the

We claim:

1. An installation device for pull-type fasteners and the like comprising an axial screw, a first axial thrust device and a first radial lever affixed to said screw, a second axial thrust device, a rotatable member, a threadable connection between said rotatable member and said screw, a reversible ratchet mechanism rotatable on said rotatable member adapted to drive it in either of two opposite rotary directions relative to the screw, a second radial lever affixed to said ratchet mechanism, and a rotatable connecting thrust device between said rotatable member and said second axial thrust device whereby the latter may assume a nonrotary condition under thrust.

2. An installation device according to claim 1, including means adapted to effect rotational release of the rotatable member from the second axial thrust device upon application of axial thrust between them when the ratchet mechanism drives in one direction and means adapted to effect connection between the rotatable member and the second axial thrust device when the ratchet mechanism moves in the reverse dierction.

3. An installation device according to claim 2, wherein said threadable connection is constituted by an Edison screw connection.

4. An installation device according to claim 2, wherein said screw is hollow and adapted to receive therein any portions removed from the fasteners by separating pulls thereon.

5. An installation device according to claim 2, wherein said screw is hollow and adapted to receive therein any portions removed from the fasteners by separating pulls thereon, and wherein said threadable connection is constituted by an Edison screw connection within said rotatable member and surrounding the hollow screw.

6. An installation device for pull-type fasteners and the like comprising an axial screw, a first axial thrust device and a first radial lever, both affixed to said screw, a first reversibly rotatable clutch member, a threadable connection between said first clutch member and said screw, a reversible ratchet mechanism rotatable on said first clutch member adapted to drive it in either of two opposite rotary directions relative to the screw, a second radial lever affixed to said ratchet mechanism, said first clutch member forming a rotatable first clutch face and a connected rotatable thrust face which are axially spaced, a second clutch member having a second clutch face axially engageable and disengageable with said first clutch face, an axial thrust member located between said thrust face of the first clutch member and the second clutch face of the second clutch member adapted to engage the thrust face when the said clutch faces separate, resilient means biasing said thrust member toward disengagement from the thrust face and biasing said clutch faces towards one another, whereby when the ratchet mechanism is set to drive the first rotatable clutch member in one direction said clutch faces are separated and thrust is applied to the first axial thrust device, and whereby when the ratchet mechanism is set to drive the first rotatable member in the reverss direction said clutch faces are engaged thereafter to hold said reversibly rotatable member stationary relative to the screw after slight reverse movement of the first member.

7. An installation device according to claim 6, wherein said threadable connection is constituted by an antifriction Edison screw.

8. An installation device according to claim 7, wherein said axial screw is hollow throughout, including its portions passing through the Edison screw.

9. An installation device according to claim 6, wherein said resilient means is constituted by an O-ring.

10. An installation device for pull-type fasteners and the like comprising a hollow axial screw, a first axial thrust device and a first radial lever, both affixed to said screw, a first reversibly rotatable clutch member, an Edison screw surrounding the hollow screw and forming a connection between said first rotatable clutch member and said screw, a reversible toothed ratchet mechanism rotatable on said first rotatable clutch member adapted to drive it in either of two opposite rotary directions relative to the screw, a second radial lever affixed to said ratchet mechanism, said first clutch member forming a rotatable first clutch face and a connected rotatable thrust face which are axially spaced, a second clutch member having a second clutch face axially engageable and disengageable with said first clutch face, a ball thrust bearing between said thrust face of the first clutch member and the second clutch face of the second clutch member adapted to engage the thrust face non-resiliently when the said clutch faces separate, a resilient O-ring located in a groove in said thrust face and adapted to expand therefrom to bias said thrust member toward disengagement and biasing said clutch faces towards one another, whereby when the ratchet mechanism is set to drive the first rotatable clutch member in one direction said clutch faces are separated and the thrust bearing compresses the O-ring to seat non-resiliently on said thrust face, whereby direct thrust is applied to the first axial thrust device while the clutch faces are separated, and whereby when the ratchet mechanism is set to drive the first rotatable member in the reverse direction said O-ring expands from its groove to press the thrust bearing from said thrust face and said clutch faces are engaged so as to hold the clutch member stationary against reverse drag action of the ratchet mechanism.

11. An installation device for pull-type fasteners and the like comprising an axial screw, a first axial thrust device and a first radial lever affixed to said screw, a nut member having a threadable connection with said screw, a reversible ratchet mechanism rotatable on said nut member adapted to drive said nut member by ratcheting in either of two opposite rotary directions relative to the screw, a second radial lever affixed to said ratchet mechanism, a clutch having axially engageable and disengageable relatively rotatable parts, a first one of which is affixed to said nut-forming member and a second one of which carries a second thrust device, axially resilient means disposed between said clutch parts adapted to be axially compressed to disengage the clutch parts in response to opposite predetermined thrusts on said thrust devices as the ratchet drives in one direction, said resilient means being adapted axially to expand to engage the clutch parts in response to reduce opposite thrusts on said thrust devices.

12. An installation device as set forth in claim 11, wherein an antifriction thrust bearing is located between the clutch parts.

13. An installation device for pull-type fasteners and the like comprising a hollow screw, a first lever connected with said screw at one end, a thrust device connected with said screw at its other end, a nut having a threadable connection with said screw, a reversible ratchet mechanism adapted to ratchet said nut in either of two different directions, a second lever on said ratchet mechanism, and a second thrust device connected with said nut.

14. An installation device made according to claim 13 including a clutch between said second thrust device and the nut adapted to open when the ratchet mechanism is operated in thrusting direction and adapted to close when the ratchet mechanism is operated in its reverse direction.

15. An installation device for pull-type fasteners comprising a screw, a lever connected with said screw, a nut having a threadable connection with said screw, a reversible ratchet mechanism connected with said nut, a second lever on said ratchet mechanism, a clutch having a first element connected with the said nut and forming opposite faces, a second clutch element engageable with one face and having thrust bearing means engageable with the other opposite face, said second clutch element having lost motion between said opposite faces, and resilient means reactive between the clutch elements biasing the second clutch element into engagement with said one face of the first clutch element, said resilient means being adapted to be compressed when the second clutch element is moved against its bias away from said one face into engagement with the opposite other face of the said first clutch element, and thrust members connected with said screw and said second clutch element respectively.

16. An installation device made according to claim 15 wherein said resilient means is constituted by an O-ring located in space provided between said clutch elements.

References Cited in the file of this patent

UNITED STATES PATENTS

| | | |
|---|---|---|
| 1,365,892 | Carver | Jan. 18, 1921 |
| 1,929,245 | Harvey | Oct. 3, 1933 |
| 1,940,421 | Kerns | Dec. 19, 1933 |
| 2,053,719 | Huck | Sept. 8, 1936 |
| 2,531,049 | Huck | Nov. 21, 1950 |
| 2,542,376 | Torresen | Feb. 20, 1951 |
| 2,575,479 | Wilt | Nov. 20, 1951 |
| 2,594,443 | Johnson | Apr. 29, 1952 |

UNITED STATES PATENT OFFICE
CERTIFICATE OF CORRECTION

Patent No. 2,923,182　　　　　　　　　　　　　　February 2, 1960

Ray A. Strother et al.

It is hereby certified that error appears in the printed specification of the above numbered patent requiring correction and that the said Letters Patent should read as corrected below.

Column 8, line 50, for "to reduce" read -- to reduced --.

Signed and sealed this 12th day of July 1960.

(SEAL)
Attest:

KARL H. AXLINE　　　　　　　　　　　　　　ROBERT C. WATSON
Attesting Officer　　　　　　　　　　　　　　Commissioner of Patents